United States Patent [19]
Drew

[11] 3,871,951
[45] Mar. 18, 1975

[54] TURPENTINE RECOVERY BY STEAM DISTILLING WOODCHIPS WHILE THEY ARE IMMERSED
[75] Inventor: John Drew, Jacksonville, Fla.
[73] Assignee: SCM Corporation, Cleveland, Ohio
[22] Filed: Nov. 1, 1973
[21] Appl. No.: 411,641

Related U.S. Application Data
[63] Continuation-in-part of Ser. No. 187,160, Oct. 6, 1971, abandoned, which is a continuation-in-part of Ser. No. 853,162, Aug. 26, 1969, abandoned.

[52] U.S. Cl. ................... 162/14, 162/62, 162/68
[51] Int. Cl. .................... D21c 1/02, D21c 1/06
[58] Field of Search ............ 162/14, 15, 17, 19, 29, 162/61, 62, 68, 90; 159/47 WL

[56] References Cited
UNITED STATES PATENTS
817,960   4/1906   Craighill et al. ................. 162/15
1,081,276  12/1913  Saylor .............................. 162/14
1,266,957   5/1918  Kress et al. ...................... 162/14

Primary Examiner—S. Leon Bashore
Assistant Examiner—Richard V. Fisher
Attorney, Agent, or Firm—Richard H. Thomas

[57] ABSTRACT

Disclosed is a method for extracting turpentine from woodchips prior to digestion to woodpulp by steam distilling turpentine from the woodchips in an aqueous alkaline solution. Improved recoveries are achieved by immersing the woodchips in an alkali metal hydroxide solution having a normality between about 0.20 and 2.0 during steam distillation.

4 Claims, 3 Drawing Figures

3,871,951

TURPENTINE RECOVERY BY STEAM DISTILLING WOODCHIPS WHILE THEY ARE IMMERSED

This application is a continuation-in-part of application Ser. No. 187,160 filed Oct. 6, 1971, now abandoned which in turn was a continuation-in-part of application Ser. No. 853,162 filed Aug. 26, 1969, now abandoned.

This invention relates to an improvement in the recovery of turpentine from woodpulping processes. More specifically, this invention pertains to a method for liberating turpentine from woodchips prior to digesting the woodchips to woodpulp in continuous or batch woodpulping processes.

BACKGROUND OF THE INVENTION

In woodpulping processes, a digester vessel is charged with woodchips and an alkaline solution of cooking liquor. The woodchips are then digested at elevated temperatures (e.g., 340° to 355°F.) and elevated pressures (e.g., 100 to 165 psi) to produce fibrous woodpulp and gaseous products containing water, turpentine and other valuable chemicals. The alkaline cooking liquor in a typical sulfate woodpulping process comprises an aqueous solution of 8% NaOH, 4% $Na_2S$ and 2% $Na_2CO_3$ and $Na_2SO_4$. This solution is called "white liquor" before it has been used for digestion and "black liquor" after digestion due to the accumulation of organic chromophores and residues. The wet gaseous effluent from the digester passes to a separator to remove entrained cooking liquor and pulp and then to an indirect heat exchanger where the vapors are condensed and liquid turpentine is recovered.

The amount of turpentine leaving the digester to the recovery process is often substantially less than the amount of turpentine available in the woodchips being digested. There is a substantial turpentine loss as a result of solubility of turpentine in the concentrated digestion liquors at the elevated temperatures and pressures employed. Furthermore, the quality of turpentine recovered often suffers because of the presence of digestion reaction by-products (e.g., mercaptans).

DESCRIPTION OF THE PRIOR ART

In the past, processes for steam distilling turpentine from woodchips prior to the digestion reaction have been attempted. For instance, Example 2 of U.S. Pat. No. 3,013,933 to Briggs discloses a presteaming process for the preparation of woodchips. The presteaming process is carried out with steam (in the absence of alkalis) at temperatures of up to 200°C. to liberate turpentine. The turpentine recovery ratio from such presteaming operations is often quite low, and its practice is not economically attractive.

U.S. Pat. No. 3,397,109 to Oman discloses the prevention of the formation of malodorous sulfurous substances in the production of sulfate woodpulp by pretreating the woodchips with an alkaline solution at temperatures of 30° to 90°C. for a time period from 5 to 30 minutes prior to digestion. It is stated that this pretreatment prevents the formation of malodorous compounds, e.g., mercaptans. This patent does not discuss turpentine or the prereaction of woodchips with the alkaline solution to liberate turpentine because undesirable by-reactions are said to take place at temperatures above about 80°C. No steam distillation of turpentine takes place because pretreatment is always carried out at temperatures below the boiling point of water.

U.S. Pat. No. 1,266,957 to Kress et al proposes a method for more uniform digestion of woodchips by preliminary impregnation under hydraulic pressure of the wood by the cooking liquor. Excess cooking liquor is then drained from the chips, and live steam is introduced into the digester. An object of the process of the patent is to recover rosin soap saponified by the alkaline cooking liquor, and it is stated in the patent that the saponification occurs on the introduction of the steam with the rosin soap coming over with distilled turpentine forming a two-phase mixture of tall oil soap and turpentine which must be separated. The rosin soaps tend to act as emulsifying agents for the turpentine inhibiting efficient phase separation.

U.S. Pat. No. 1,081,276 to Saylor discloses the steam distillation of turpentine and rosin soap from woodchips by a complex impregnation- evacuation- pressurization and steam-distillation process. This patent is specifically concerned with the removal of resinous substances during the steam distillation and states at page 2, lines 30 through 40, that resinous substances distill or dissolve from the woodchips. This method is also burdened with the problem of separating the emulsion of turpentine from tall oil soaps.

U.S. Pat. No. 817,960 to Craighill et al. shows the saturation of woodchips with just enough alkaline solution to have the effect of partially dissolving the contents of the wood and to fix the various volatile acids and oils preventing their passing off with the turpentine. It is said that the strength of this alkaline solution varies with the proportion of rosin in the wood but is always just sufficient to saponify the rosin and oils and neutralize the acids without dissolving the other extractive matters of the wood. The woodchips are then steamed, and the turpentine is recovered. The woodchips are then further digested with additional alkaline solution to produce the woodpulp. This method does not employ sufficient alkaline material to efficiently release the turpentine, and a great deal of turpentine remains with the woodchips when the chips are steam distilled.

SUMMARY OF THE INVENTION

The present invention provides a method for liberating and recovering turpentine from the woodchips in a pretreatment step prior to the digestion reaction to produce high yields of turpentine of excellent quality. The quality of the turpentine produced approaches that of gum turpentine in that it does not contain sulfurous by-products (e.g., mercaptans) of the digestion reaction.

The above and other advantages of the present invention are realized by steam distilling turpentine from woodchips immersed in a dilute aqueous alkaline medium of 0.20 to 2.0 normality prior to the digestion reaction.

BRIEF DESCRIPTION OF THE DRAWINGS

Procedures for practicing the present invention will be more fully understood by references to the drawings wherein.

Figure 1:
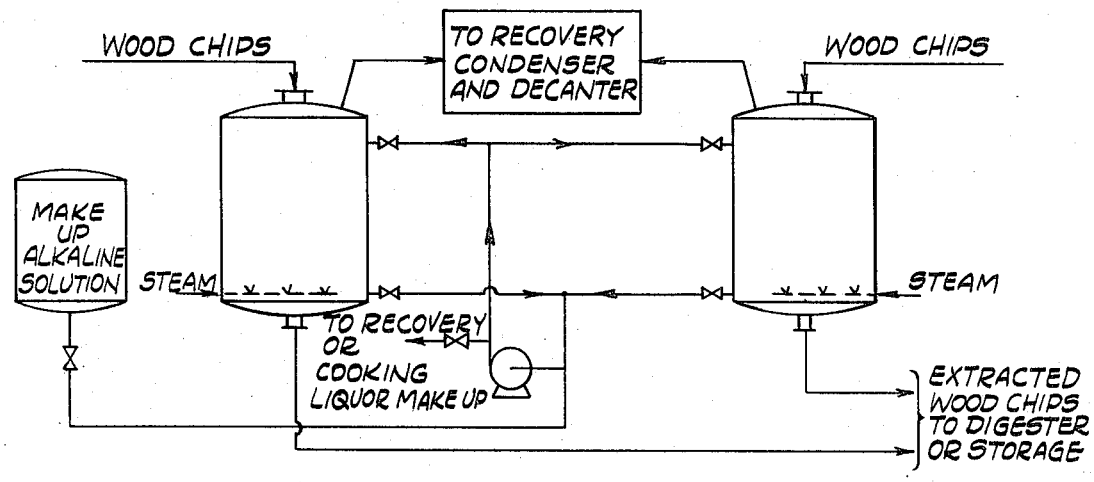
FIG. 1 is a process schematic for practicing the present invention in an alternating batch-type operation.

In practicing the present invention, the woodchips are charged to a distilling vessel (still) which is equipped with a steam sparging line, an overhead vapor line, a condenser, a condensate receiver and a decanter or centrifuge, or some other type of gravity separator. Such equipment is described in commonly assigned copending application Ser. No. 751,425 filed Aug. 9, 1968 (now U.S. Pat. No. 3,607,617). A dilute aqueous alkaline solution is then charged to the vessel in an amount sufficient to cover and thoroughly immerse the woodchips therein. The aqueous alkaline solution employed has a normality of alkali metal hydroxide in the range of about 0.20 to about 2.0 and preferably 0.5 to about 1.0 Normal for efficiency and economy; and the alkaline solution is present in an amount sufficient to provide alkali metal hydroxide in the range of about 5 times to 200 times the theoretical amount required to neutralize tall oil acids present in the woodchips. The tall oil acids in the woodchips are tall oil rosin and tall oil fatty acids. The content of these tall oil acids in the wood is determined by conventional analytical techniques or can be derived from the approximation that one cord (about 4,800 pounds) of wood yields 50 pounds of tall oil.

As will be seen from the following examples, three factors are important to achieving the desired yields of turpentine. These examples show (1) that the woodchips must be immersed in the alkaline solution, (2) that the alkaline solution must have a normality in the range of about 0.20 N to about 2 N and preferably 0.5 N to 1 N and (3) that the solution must be present in an amount sufficient to provide alkali metal hydroxide in the range of about five times to about 200 times the theoretical amount required for neutralization of the tall oil acids in the woods.

Furthermore, it is important that the steam distillation be carried out to steam distill off a product consisting essentially of turpentine without substantially digesting the woodchips to woodpulp and without the substantial steam distillation of tall oil rosins and soaps. The presence of these tall oil rosins and soaps in the steam distillate tend to emulsify the turpentine in the water phase and thereby detract from the recovery efficiency.

Once the vessel is charged with aqueous alkaline solution and woodchips, steam is admitted through a sparging line such as a perforated pipe in the bottom of the still to give maximum contact between the steam and the charge of woodchips and alkaline solution or indirect heat may be applied to the vessel to furnish heat to cause boiling of the solution. The process may be operated under any of three conditions.

In the first condition, the only energy supplied to the still is in the form of direct steam. Some of the steam condenses to provide heat to raise the temperature of the charge to the distilling temperature, to supply the heat of vaporization and to compensate for heat loss. Under these conditions steam condenses in the still and further dilutes the aqueous alkaline solution.

In the second condition, either the steam is considerably superheated or additional heat is supplied to the charge by an indirect heat exchanger such as a heating coil, and the condensing of steam in the still is prevented. All steam blown through the charge passes out with the distillation products.

In the third condition, no direct steam is added. Sufficient indirect heat is applied through an exchanger to raise the temperature of the charge to distilling temperature and to supply heat of vaporization and compensate for heat loss.

In any method when the sum of the partial pressure of the steam and the partial pressure of the turpentine reaches the total pressure, the steam and the turpentine are distilled over in the molecular ratio of their partial pressures.

The steam distillate comprises two immiscible liquid phases: the aqueous or heavier phase which is primarily water and the lighter phase consisting essentially of turpentine. The two immiscible phases are separated by decantation, centrifugation or other gravimetric separation techniques; and the turpentine is sent to storage. The aqueous phase can be recovered or recycled for reuse.

The exact chemical mechanism responsible for the improved turpentine yields from woodchips through steam distillation from a dilute aqueous alkaline solution as compared to steam distillation from water is not fully understood, although it is suspected that the alkali somehow extracts or leaches the turpentine from the woodchips without digesting the chips to pulp. This steam distillation does not affect the quality of woodpulp ultimately formed. If the alkali is too low in normality, there may be insufficient opening of the pores of the wood to release turpentine. At high normality, for instance 3 N, the caustic may form soaps with the rosin acids which tend to seal off the wood pores. In any event, improved recoveries are achieved in the very narrow range of about 0.20 N to about 2.0 N.

The term aqueous alkaline solution is used herein according to its conventional meaning, i.e., a solution containing more hydroxyl ions than hydrogen ions; a solution reacting alkaline or basic. The solutions are effective in base concentrations as low as about 0.20 N for recovering about 70% (the lower practical limit for recovery) of the available turpentine from the wood. Usually the range of base concentration is between about 0.5 N and 1 N for economy and efficiency in turpentine recovery, although higher concentrations such as up to 2 N can be used. Bases such as alkali metal hydroxide (e.g., NaOH, KOH, LiOH) and alkaline earth metal hydroxides (e.g., $Ca(OH)_2$, $Mg(OH)_2$ and $Ba(OH)_2$) are particularly effective and readily available. Other bases can also be employed, although dilute solutions of sodium hydroxide in concentrations in the range of about 0.2 N to 2 N (0.8% to 8% NaOH by weight) are preferred because sodium hydroxide is used in the cooking liquors in the subsequent digestion process. Sodium hydroxide is also preferred because it is readily available, inexpensive, does not contaminate the turpentine and contributes compatible alkalinity to the pulp digester with the woodchips. In fact, "white liquor" can be used as the alkaline solution in the steam distillation, although it is usually desirable to use an alkaline solution that does not contain sulfur. Black liquor is not used because of high impurity content.

The steam distillation pressure is not particularly critical, although the pressure should not be so high as to actually digest the woodchips to pulp. Atmospheric pressure steam distillation with open steam at 212°F. provides efficient extraction of turpentine from woodchips in time periods of 5 minutes to about 2 hours, usually about ½ to 1 hour, utilizing the alkaline solution described above without substantial digestion of the woodchips. Higher pressures (i.e., up to 50 psig) can also be employed if desired, although correspondingly shorter time periods must be employed to prevent substantial digestion to pulp with liberation of tall oil rosins and soaps. Pressures at lower than atmospheric pressure (partial vacuum) can also be employed if desired, although these high and low pressure operations do not provide sufficient advantages over atmospheric pressure operations to justify the additional equipment expense.

FIG. 1 illustrates an alternating batch type of operation wherein woodchips are alternately steam distilled in stills connected in parallel. The operating technique is similar to the technique described in the examples, and the process flow lines are illustrated in FIG. 1.

Figure 2:
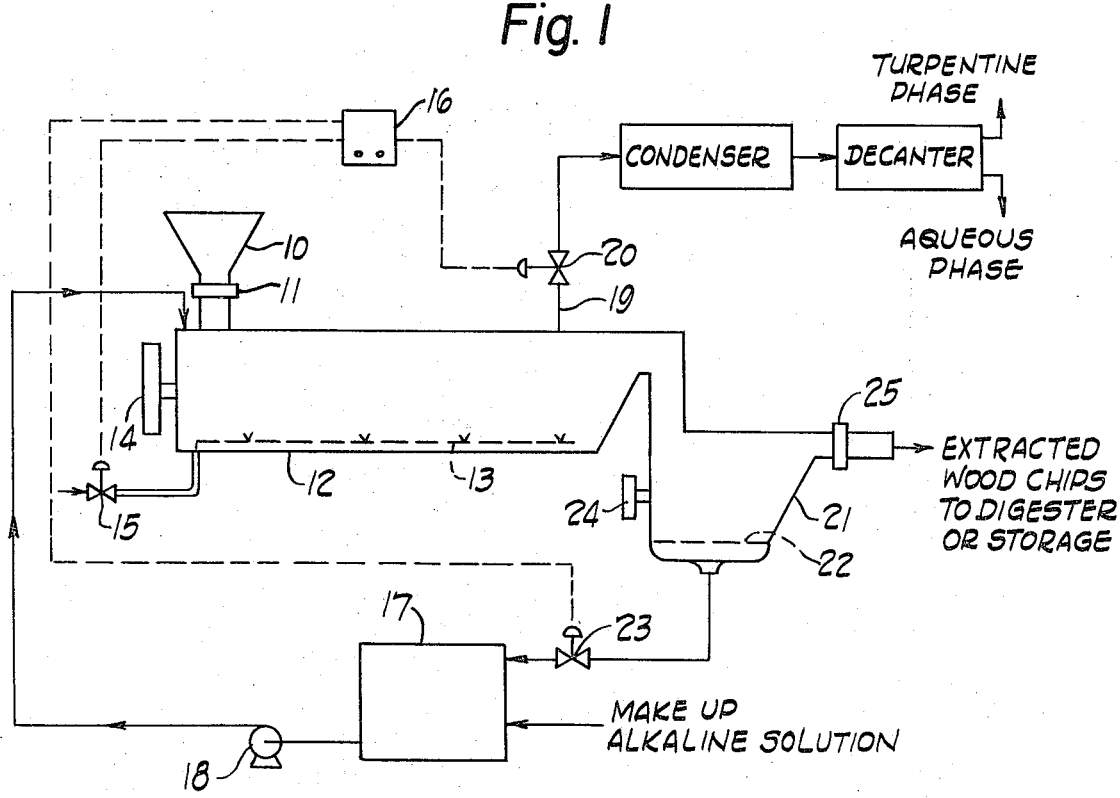
FIG. 2 is a process schematic for practicing the present invention in a continuous process.

Referring now to FIG. 2, woodchips are fed from hopper 10 through metering device 11 into distillation chamber 12. Chamber 12 is equipped with a steam sparge line 13 and screw conveyor 14. Steam is admitted to chamber 12 through sparge line 13 equipped with control valve 15 which is actuated by pressure controller 16.

Aqueous alkaline solution is pumped from supply tank 17 by pump 18 to chamber 12 where it intimately mixes with and impregnates the incoming woodchips. The screw conveyor 14 moves the mixture of woodchips and alkaline solution through chamber 12 while steam is sparged therethrough. The steam distillation products leave chamber 12 through vapor line 19. The flow through vapor line 19 is controlled by control valve 20 which is also actuated by pressure controller 16. The vapors are then condensed, and the turpentine is separated from the aqueous phase.

The extracted woodchips pass from distillation chamber 12 to separation chamber 21 where the alkaline solution drains therefrom through screen 22. The alkaline solution returns to supply tank 17 through control valve 23 for reuse. Control valve 23 is also actuated by pressure controller 16.

A portion of the alkaline solution draining through screen 22 can be withdrawn through a suitable outlet (not shown) and sent to recovery or used as make-up for the cooking liquor to the digester. The alkaline solution is withdrawn when the accumulated impurities affects the quality of the turpentine produced.

The extracted woodchips pass through separation chamber 12 by means of a second screw conveyor 24. The extracted chips leave chamber 21 through metering device 25 and pass to the digester or storage. The pressure in the steam distillation system can be set at any predetermined level by pressure controller 16. When atmospheric pressure is used, the valves 20 and 23 are set to remain open.

The following examples illustrate the practice of the present invention. All parts are parts by weight, and all percentages are weight percentages unless otherwise indicated.

Throughout the following examples, the term "available turpentine" is used as a basis for evaluating the effectiveness of recovery of turpentine. "Available turpentine" is not an absolute value, but rather is a relative value determined in a test employing 0.5 N (2% by weight) NaOH. In particular, it is determined by measuring the turpentine liberated by refluxing the distillate from a mixture containing 500 grams of woodchips in a solution containing 30 grams NaOH, 18 ml. of ethylene glycol and 100 ml. of water for 2 hours or until no further turpentine is liberated on continued distillation. Two or more determinations are made, and the result reported represents the average value. The test gives maximum recovery of turpentine in a limited period of time and also results which correspond with any known more stringent method for measuring availability.

The test and apparatus therefore are described in *Sulfate Turpentine Recovery*, pages 57–59, by John Drew, James Russell and Henry W. Bajak, Copyright 1971, Pulp Chemicals Association. The effectiveness of the test as a standard has caused it to be accepted by the Pulp Chemicals Association, although the test was subsequently revised to eliminate the use of ethylene glycol.

It is, of course, recognized that the available turpentine will vary with different woodchips, some woodchips having more available turpentine than others. The test provides an effective standard for determining the effectiveness of a process for recovering turpentine regardless of the actual amount of turpentine available.

EXAMPLE 1 (0.5 N)

This example demonstrates the effectiveness of the concepts of the present invention in the recovery of turpentine under pilot plant conditions employing a 0.5 N sodium hydroxide solution and steam sparging.

Three thousand grams of pine chips were charged to a reaction vessel set up for atmospheric pressure steam distillation. The reaction vessel comprised a vessel equipped with a bottom steam sparge line and a vapor vent line connected to a condenser and liquid decanter. There was a 100-mesh screen in the vapor vent line to prevent entrainment of solids. The pine chips were ordinary pine chips having a moisture content of about 49.4% and an available turpentine content of about 12 ml.

The chips were immersed in one gallon 0.5 N (about 2% by weight) aqueous sodium hydroxide solution. This provided about 17.2 times the amount of the NaOH required for the neutralization of tall oil acids. Steam sparging was started and after bringing the reactor contents to the atmospheric boiling point, steam distillation of turpentine began. The steam distillation was continued for about 35 to 45 minutes; and at the end of this period, 207 ml. of condensate consisting of 12 ml. of turpentine phase and 195 ml. of water had been collected. No tall oil rosins and soaps were observed in the distillate. The wood remained in the form of chips and had not been digested to pulp. This demonstrated that essentially all of the available turpentine could be recovered by the present invention by steam distillation without injury to the wood fibers. A material balance over the steam distillation indicated the following.

Charged to Still
  3,000 grams of chips at 49.42% moisture = 1,517 grams of dry chips containing the equivalent of 12 ml. of available turpentine.
Recovered from Still
  3,226 grams of chips at 53.35% moisture = 1,505 grams dry chips
Recovered as Condensate
  12 ml. of turpentine Similar results can be obtained using equivalent (equivalent with respect to normality) LiOH or KOH as the aqueous alkaline solution.

EXAMPLE 2 (0.5 N)

Figure 3:
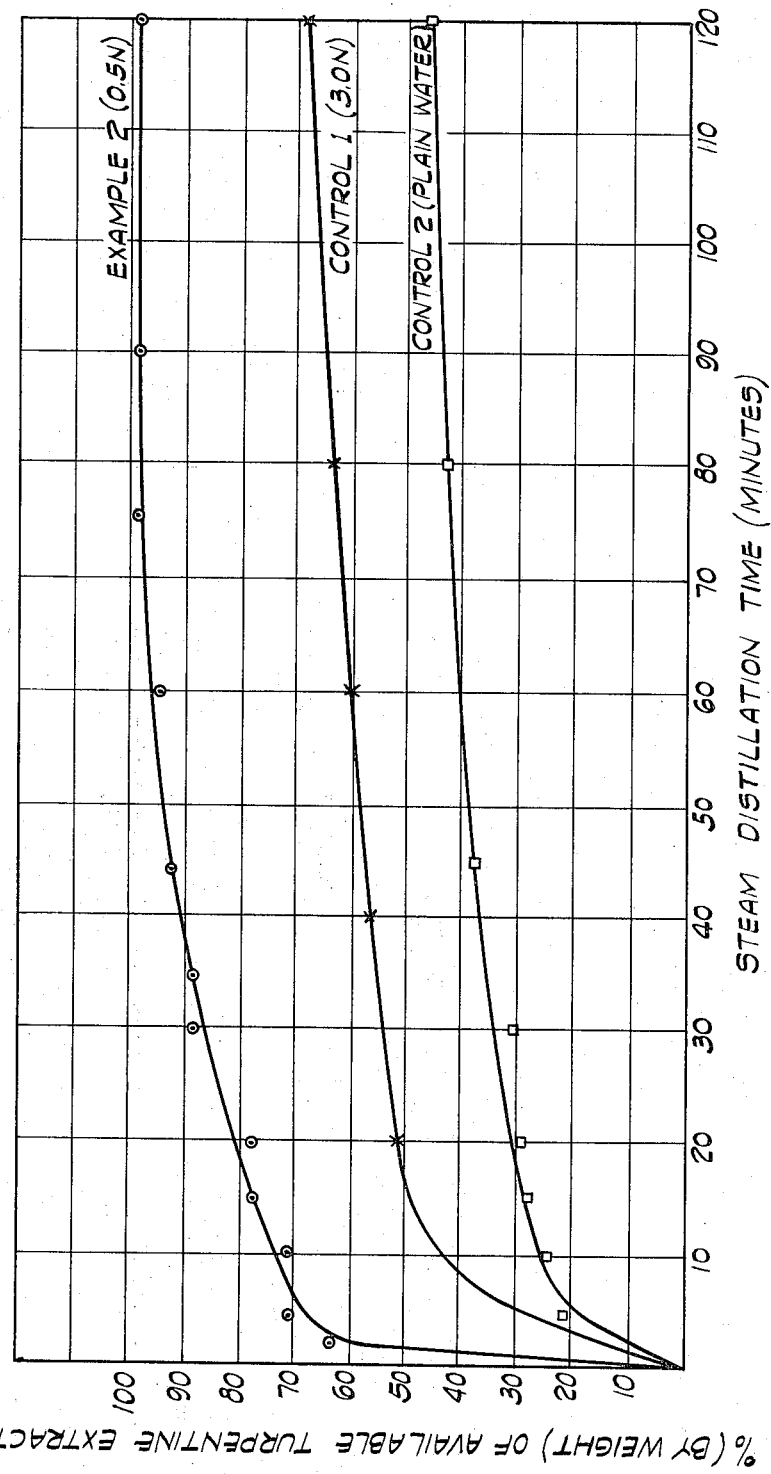
FIG. 3 is a graphic presentation of data from certain examples.

Three thousand grams of pine chips containing 1.4 gallons (8.75 ml.) of available turpentine per ton of oven dried chips were charged to a steam distillation apparatus similar to the one described in Example 1. The woodchips were immersed in 0.5 N (about 2% by weight) aqueous sodium hydroxide solution having a pH of about 11, and the steam distillation was begun. Aliquot samples of the woodchips were taken at the time intervals indicated in FIG. 3 to determine the amount of available turpentine remaining in the woodchips. This data is plotted in FIG. 3 and indicates that the percentage of extracted turpentine is a function of steam distillation time. The percentage of turpentine extracted approached 100% as the steam distillation time approached 2 hours, although a substantial percentage of turpentine had been liberated after only 5 to 10 minutes.

The turpentine recovered was analyzed and was found to contain more α-pinene, less camphere, slightly more β-pinene and less distillation residues than turpentine conventionally recovered from a digester.

EXAMPLE 3 (0.10 – 0.50 N)

A charge of 500 grams of fresh Southern Pine woodchips was cooked in an alkaline solution, and liberated turpentine was collected in a trap similar to that described in ASTM D 889. In a series of tests, the charge was introduced into a 4-liter resin reaction kettle containing 2,000 ml. of water mixed with varying amounts of sodium hydroxide (sufficient to immerse the chips) to provide normalities in the range of 0.10 to 0.50. Steam distillation and refluxing was carried out by indirect heating in each test for two hours, with the following results:

Table 1

| Test | Normality | Recovery in ml. | Percentage of Available Turpentine Extracted |
|---|---|---|---|
| 1 | 0.10 | 0.275 ml. | 28.9% |
| 2 | 0.20 | 0.675 ml. | 71.0% |
| 3 | 0.30 | 0.725 ml. | 76.3% |
| 4 | 0.40 | 0.825 ml. | 86.8% |
| 5 | 0.50 | 0.95 ml. | 100.0% |

The above table shows that the normality critical lower limit for achieving at least 70% recovery of the available turpentine is about 0.20. Tests have been conducted with 0.10 N and 0.05 N sodium hydroxide solutions and some tests have given high recoveries at these normalities, but consistently high recoveries above 70% have been obtained only with normalities above about 0.20.

CONTROL 1 (3.0 N)

The procedure of Example 3 was repeated except that the woodchips were immersed in a 3.0 N aqueous sodium hydroxide solution. Sample yields were read directly in a collection trap similar to that described in ASTM D 889 at intervals up to two hours. The data indicates that the percentage of turpentine extracted approached only about 70% as the steam distillation approached 2 hours. The data is plotted in FIG. 3.

Table 2

| Time (minutes) | Percent Available Turpentine Recovered |
|---|---|
| 20 | 52% |
| 40 | 56% |
| 60 | 60% |
| 80 | 64% |
| 120 | 68% |

CONTROL 2 (With plain water)

As a control on the effectiveness of the alkaline solution in liberating turpentine during a steam distillation, Example 2 was repeated with a similar charge of woodchips except that the woodchips were immersed only in plan water. Steam distillation was carried out as in Example 2 with the withdrawal of aliquot samples of woodchips. The data (plotted in FIG. 3) indicated that the percentages of turpentine extracted approached only 50% as the steam distillation time approached 2 hours.

The above data indicates that the apparent maximum turpentine extraction efficiency for a steam distillation at atmospheric pressure in the absence of alkalis is about 50%.

CONTROL 3 (2 N without immersion during steam distillation)

Five hundred grams of pine chips were immersed in 1,800 ml. of 2 N sodium hydroxide for 10 minutes to thoroughly impregnate the chips with sodium hydroxide solution. At the end of this period, the residual caustic solution was drained from the chips. The caustic solution drained from the chips was measured and titrated with acid to determine how much sodium hydroxide remained in the chips. This titration indicated that 8.1 grams of sodium hydroxide remained on the chips.

The impregnated chips were then charged to a reaction vessel set up for atmospheric steam distillation. The reaction vessel comprised a vessel equipped with a bottom steam sparge line and a vapor vent line connected to a condenser and liquid decanter. There was a 100-mesh screen in the vapor vent line to prevent entrainment of solids. Steam sparging was begun with steam at atmospheric pressure and continued until no more turpentine was observed in the steam distillate decanter. This took approximately two hours. At the end of this period, approximately 63% by weight of the available turpentine had been removed from the chips and recovered in the decanter.

These data indicate that the impregnation and steam distillation treatment of the type indicated by U.S. Pat. No. 1,266,957 is not as effective as the present method in collecting turpentine.

CONTROL 4 (1 N without immersion during steam distillation)

The procedure of Control 3 was repeated except that 1 N sodium hydroxide solution was used in place of 2 N sodium hydroxide solution as the impregnating liquor. Titration of the drained sodium hydroxide solution indicated that about 4.7 grams of sodium hydroxide remained on the woodchips. After steam distillation as in Control 3, only about 60.5% of the available turpentine had been recovered.

CONTROL 5

(Immersion with theoretical amount of NaOH)

Five hundred grams of pine chips were charged to a reaction vessel set up for atmospheric steam distillation. The reaction vessel comprised a vessel equipped with a bottom steam sparge line and a vapor vent line connected to a condenser and liquid decanter. There was a 100-mesh screen in the vapor vent line to prevent entrainment of solids. The pine chips were ordinary pine chips containing about 50% moisture.

The chips were covered with 1,800 ml. of a 0.01 N aqueous sodium hydroxide solution. This solution contained 0.72 grams of NaOH. This was the theoretical amount of NaOH required to just neutralize acid present in the woodchips. (For the purpose of this invention, the theoretical amount of base to neutralize the acids present in the wood was calculated on the assumption that 50 pounds of tall oil [rosin plus fatty acids] were produced per cord of wood used. This is an average value published by the Pulp Chemical Association since one equivalent weight of base reacts ultimately to produce one equivalent of tall oil. Then 40 pounds of NaOH is required for 290 pounds of tall oil since there are 4,800 pounds of wood per cord, the theoretical amount of sodium hydroxide is readily calculated.)

The sodium hydroxide solution readily soaked into the woodchips and after a short time, the woodchips absorbed enough caustic to become immersed in the solution. Steam sparging was then initiated; and after bringing the reactor contents to the atmospheric boiling point, steam distillation of turpentine was begun. The steam distillation continued for about 2 hours after which time no more turpentine was collected in the turpentine decanter. Only about 54.0% of the available turpentine was collected in the decanter. This Control test showed steam distillation as in U.S. Pat. No. 817,960 (Craighill et al.) was not as efficient as the present method in recovering turpentine.

EXAMPLE 4 (1.0 N)

Example 3 was repeated except that the normality of the sodium solution was 1.0 N. This is approximately 100 times the theoretical amount of NaOH required for neutralization of wood acids. At the end of the steam distillation, about 95% of the available turpentine had been recovered.

EXAMPLE 5 (2.0 N)

Example 4 was repeated except that the normality of the sodium hydroxide solution was 2.0 N. At the end of the steam distilling, 73% of the available turpentine had been recovered.

The importance of the present invention resides in part in the need today to avoid pollution of streams and the atmosphere requiring maximum removal of turpentine from woodpulp prior to digestion. At the same time, the pretreatment procedure of the present invention utilizing a weak caustic solution is not injurious to the wood fibers.

Having thus described the invention, what is claimed is:

1. In the recovery of turpentine from a woodpulping process wherein woodchips are digested in an alkaline digestion liquor to yield woodpulp and vaporous products containing turpentine, the improvement which comprises:

immersing said woodchips prior to digestion to pulp in an aqueous alkaline solution having a normality of alkali metal hydroxide in the range of about 0.20 to about 2.0, said solution being present in an amount sufficient to provide alkali metal hydroxide in the range of about five times to about 200 times the theoretical amount required to neutralize the tall oil acids present in said woodchips;

steam distilling from the woodchips while they are immersed prior to digestion a product consisting essentially of turpentine for a sufficient time less than about two hours to liberate at least about 70% by weight of the available turpentine but for a temperature and said time insufficient for digesting said woodchips to woodpulp; and condensing the steam distillate and separating and collecting turpentine from the steam distillate, said steam distillate being substantially free of tall oil rosins and soaps;

the turpentine recovered being substantially free of sulfurous by-products.

2. The process of claim 1 wherein said steam distillation is conducted at atmospheric pressure.

3. The process of claim 1 wherein said alkali metal hydroxide is sodium hydroxide.

4. The process of claim 1 wherein said normality is in the range of about 0.5 to about 1.

* * * * *